United States Patent
Koenigsegg

(10) Patent No.: US 8,807,929 B2
(45) Date of Patent: Aug. 19, 2014

(54) TURBINE HOUSING FOR A SUPERCHARGER

(75) Inventor: Christian V. Koenigsegg, Vejbystrand (SE)

(73) Assignee: Alpraaz AB, Vejbystrand (SE)

( * ) Notice: Subject to any disclaimer, the term of this patent is extended or adjusted under 35 U.S.C. 154(b) by 590 days.

(21) Appl. No.: 13/100,611

(22) Filed: May 4, 2011

(65) Prior Publication Data

US 2011/0274539 A1 Nov. 10, 2011

(30) Foreign Application Priority Data

May 4, 2010 (SE) .................................... 1050440

(51) Int. Cl.
*F04D 29/42* (2006.01)
*F02B 37/02* (2006.01)
*F01D 17/14* (2006.01)
*F01D 9/02* (2006.01)
*F01D 17/18* (2006.01)

(52) U.S. Cl.
CPC .............. *F01D 9/026* (2013.01); *F02B 37/025* (2013.01); *Y02T 10/144* (2013.01); *F01D 17/148* (2013.01); *F05D 2220/40* (2013.01); *F01D 17/18* (2013.01)
USPC ............................ 415/184; 415/185; 415/205

(58) Field of Classification Search
USPC ................... 415/183–186, 203–205, 212.1
See application file for complete search history.

(56) References Cited

U.S. PATENT DOCUMENTS

| | | | | | |
|---|---|---|---|---|---|
| 2,955,540 | A | * | 10/1960 | Pawlicki | 415/204 |
| 3,043,229 | A | * | 7/1962 | Atwood, Jr. et al. | 415/204 |
| 3,137,477 | A | * | 6/1964 | Kofink | 415/166 |
| 3,664,761 | A | * | 5/1972 | Zastrow | 415/205 |
| 4,389,845 | A | * | 6/1983 | Koike | 60/602 |
| 4,512,714 | A | * | 4/1985 | Kaesser | 415/151 |
| 2009/0047121 | A1 | * | 2/2009 | Whiting et al. | 415/144 |

FOREIGN PATENT DOCUMENTS

| | | |
|---|---|---|
| GB | 2 062 116 A | 5/1981 |
| JP | 01056922 A | 3/1989 |

* cited by examiner

*Primary Examiner* — Edward Look
*Assistant Examiner* — William Grigos
(74) *Attorney, Agent, or Firm* — Young & Thompson

(57) ABSTRACT

A turbine housing for a supercharger, includes an inlet opening, a turbine seat and a race extending from the inlet opening to the turbine seat, the race including a first spiral chamber (7) which mouth into the turbine seat and a second spiral chamber (8) which mouth into the turbine seat. Both the first spiral chamber (7) and the second spiral chamber (8) mouth in a first angular segment (β) of the turbine seat, the axial height of the mouth into the turbine seat of the second spiral chamber (8) in the first angular segment (β) is bigger in the end of the first angular segment (β) than in the beginning thereof seen in a flow direction (F), and in that the A/R-ratio of the first spiral chamber (7) is smaller than the common A/R-ratio of the first spiral chamber (7) and the second spiral chamber (8).

20 Claims, 5 Drawing Sheets

TURBINE HOUSING FOR A SUPERCHARGER

TECHNICAL FIELD OF THE INVENTION

The present invention relates in general to a supercharger, also known as a turbocharger, arranged to increase the effect of a combustion engine, a turbine of the supercharger being driven by the exhaust gases of the combustion engine, which turbine is connected to a compressor impeller of the supercharger, which compressor impeller compress the intake air of the combustion engine. In particular the present invention relates to a turbine housing for a supercharger, which turbine housing comprises an inlet opening, a turbine seat and a race extending from said inlet opening to said turbine seat. Furthermore, said race comprises a first spiral chamber which mouth in said turbine seat as well as a second spiral chamber which mouth in said turbine seat. In a second aspect the present invention relates to a supercharger comprising such a turbine housing.

BACKGROUND OF THE INVENTION AND PRIOR ART

Known superchargers, or turbochargers, belong more or less exclusively to one of the following three basic types of superchargers. Superchargers presenting a turbine housing having one single spiral chamber, a turbine housing having two parallel spiral chambers, or a turbine housing having variable geometry.

In a turbine housing having one single spiral chamber the spiral chamber presents an inlet having a small area or an inlet having a large area in relation to the radius of the inlet of the spiral chamber, usually defined as small and large A/R-ratio, respectively. Turbine housing having a spiral chamber presenting a small inlet area in relation to the radius of the inlet of the spiral chamber are arranged to cause overcharge already at small exhaust gas flows, which as a rule coincide with low engine speed, but at big exhaust gas flows, which as a rule coincide with high engine speed, a large back pressure will be created in this type of turbine housing whereupon a large amount of the exhaust gas flow will be released via a waste gate and thereby a desired overcharge will not be attained at high engine speed. Turbine housing having one spiral chamber presenting a large inlet area in relation to the radius of the inlet of the spiral chamber are on the other hand arranged to create overcharge at high engine speed and large exhaust gas flow. However, this type of turbine housing presents worse efficiency or large overcharge delay which implies that none overcharge takes place at low engine speed and small exhaust gas flow.

In a turbine housing having parallel spiral chambers the turbine housing comprises two spiral chambers, which are separated by a radially extending wall and which have the same or different inlet areas and/or radius at the inlet thereof. However, it shall be pointed out that the common inlet area of the two spiral chambers in relation to the radius of the inlet of the spiral chambers usually is classified as large by comparison with a turbine housing having one single spiral chamber, thus the turbine housing of this type is suitable for large exhaust gas flow and high engine speed. Furthermore, both the first spiral chamber and the second spiral chamber mouth in parallel with each other around the entire turbine seat of the turbine housing. The function of the radially extending wall is to guide the exhaust gas flow coming from a first set of complementary cylinders to one spiral chamber and the exhaust gas flow coming from a second set of complementary cylinders to the other spiral chamber. By having only complementary cylinders, i.e. cylinders not having their exhaust gas outlet valves open at the same time, operatively connected to each other no back flow takes place from a first cylinder to a second cylinder having partly overlapping cycle with said first cylinder. In theory the turbine is thus alternately affected by the exhaust gas flow from one and the other spiral chamber, which gives a better utilization of the exhaust gas pulse energy even at low engine speed. Thus, a turbine housing having parallel spiral chambers provide a larger engine speed range within which a desired overcharge takes place, in relation to a turbine housing having one single spiral chamber.

In a turbine housing having variable geometry a great number of vanes are arranged at the interface between the spiral chamber and the turbine seat. The vanes are maneuverably movable between a more or less tangential position in relation to the turbine seat and a more or less radial position in relation to the turbine seat. At low engine speed and small exhaust gas flow the vanes are moved to the tangential position and at high engine speed and large exhaust gas flow the vanes are moved to the radial position. Thanks to the variable geometry a desired overcharge takes place already at very low engine speed at the same time as a desired overcharge also takes place at high engine speed. However, this solution is very expensive and construction wise complicated due to the great number of small movable parts in combination with high operational temperatures existing in turbine housing during operation. This applies in special to Otto-engines generally having higher exhaust gas temperatures than diesel engines. Thus, a turbine housing having variable geometry is uncommon in connection with Otto-engines.

BRIEF DESCRIPTION OF THE OBJECTS OF THE INVENTION

The present invention aims at obviating the aforementioned disadvantages and failings of previously known turbine housing and at providing an improved turbine housing. A primary object of the present invention is to provide an improved turbine housing of the initially defined type, which provide desired overcharge at small as well as large exhaust gas flows and thereby at low and high engine speed, respectively.

Another object of the present invention is to provide a turbine housing comprising few or none moveable parts.

It is another object of the present invention to provide a turbine housing being arranged to operate at high operational temperatures.

BRIEF DESCRIPTION OF THE INVENTION

According to the invention at least the primary object is attained by the means of the initially defined turbine housing, which is characterized in that both the first spiral chamber and the second spiral chamber mouth in a first angular segment of the turbine seat, the axial height of the mouth into the turbine seat of the second spiral chamber in said first angular segment is bigger in the end of the first angular segment than in the beginning thereof seen in a flow direction, and in that the A/R-ratio of the first spiral chamber is smaller than the common A/R-ratio of the first spiral chamber and the second spiral chamber.

Thus, the present invention is based on the understanding that in the beginning of the turbine seat, seen in the flow direction, the first spiral chamber has a large mouth into the turbine seat in relation to the mouth of the second spiral chamber, and thereto the first spiral chamber presents an optimized geometry for small exhaust gas flow. This results in that the exhaust gas flow in the first spiral chamber is provided with a relatively high speed and an optimized attack angle for small exhaust gas flow, that is the exhaust gas flow is more tangentially directed in relation to the turbine, and can affect a large part of or the entire axially accessible height of the turbine in the turbine seat at the beginning of the turbine seat, seen in the flow direction. Furthermore, the present invention is based on the understanding that in the downstream direction in the first angular segment the mouth into the turbine seat of the second spiral chamber and thereto the second spiral chamber presents an optimized geometry for large exhaust gas flow. This results in that the exhaust gas flow in the second spiral chamber is provided with an optimized speed and an optimized attack angle for large exhaust gas flow, that is the exhaust gas flow is more radially directed in relation to the turbine than the exhaust gas flow of the first spiral chamber, and can affect a large part of or the entire axially accessible height of the turbine in the turbine seat at the end of the turbine seat seen in the flow direction.

Preferred embodiments of the present invention are further defined in the dependent claims.

Preferably the second spiral chamber comprises a maneuverable flow regulator. This entails that the second spiral chamber can be entirely or partly closed at for instance small exhaust gas flow, this presuppose that the exhaust gases from all working cylinders of the combustion engine concerned can be lead both to the first spiral chamber and to the second spiral chamber.

According to a preferred embodiment the first spiral chamber comprises a maneuverable flow regulator. This entails that the first spiral chamber can be entirely or partly closed. The advantage of being able to close the first spiral chamber and the second spiral chamber is among other things that at cold starting of the engine the exhaust gases can be lead past the supercharger and directly to a catalyst, or a pre catalyst, without first being chilled by the supercharger.

Preferably an outer determining surface of the second spiral chamber is arranged outside an outer determining surface of the first spiral chamber seen in the radial direction. This entails an even more optimized speed of the exhaust gases in the first spiral chamber at small exhaust gas flow.

Preferably the second spiral chamber presents a larger cross sectional area than the first spiral chamber in each radial cross section of the race. This entails that the second spiral chamber is optimized for large exhaust gas flow and the first spiral chamber is optimized for small exhaust gas flow.

Preferably only the first spiral chamber mouth in a second angular segment of the turbine seat, which second angular segment seen in the flow direction is arranged downstream and adjacent an inlet of the turbine housing. Furthermore both the first spiral chamber and the second spiral chamber mouth in a first angular segment of the turbine seat seen in the flow direction, which first angular segment is arranged downstream and adjacent said second angular segment. More preferably the axial height of the mouth into the turbine seat of the second chamber in the first angular segment increases in the direction of said flow direction, and furthermore it is preferred that the axial height of the mouth into the turbine seat of the first spiral chamber in the first angular segment decreases in the direction of said flow direction. Thus, a successive decrease of the mouth into the turbine seat of the first chamber and a successive increase of the mouth into the turbine seat of the second chamber takes place.

Preferably said second angular segment of the turbine seat is bigger than 40 degrees, preferably bigger than 80 degrees. Furthermore it is preferred that said first angular segment and said second angular segment of the turbine seat together is bigger than 300 degrees, preferably bigger than 340 degrees. It shall be pointed out that the second angular segment can be 0 degrees.

Preferably the first spiral chamber and the second spiral chamber are separated from each other by means of a wall having a principally axial extension parallel to the flow direction at said inlet opening and in said second angular segment. Thereby the first spiral chamber is provided with an optimized geometry for small exhaust gas flow in the beginning of the first angular segment in which the mouth of the first spiral chamber constitute a dominating part, as well as in the second angular segment when it differ from 0 degrees.

The object of the invention is also attained by means of the initially defined supercharger, which is characterized in that it comprises such a turbine housing.

Other advantages and features of the invention will be apparent from the other dependent claims as well as from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DETAILED DESCRIPTION OF PREFERRED EMBODIMENTS

The present invention relates in general to a supercharger, also known as a turbocharger, arranged to increase the effect of a combustion engine, the supercharger being driven by the exhaust gas of the combustion engine and compress the intake air of the combustion engine.

Figure 1:
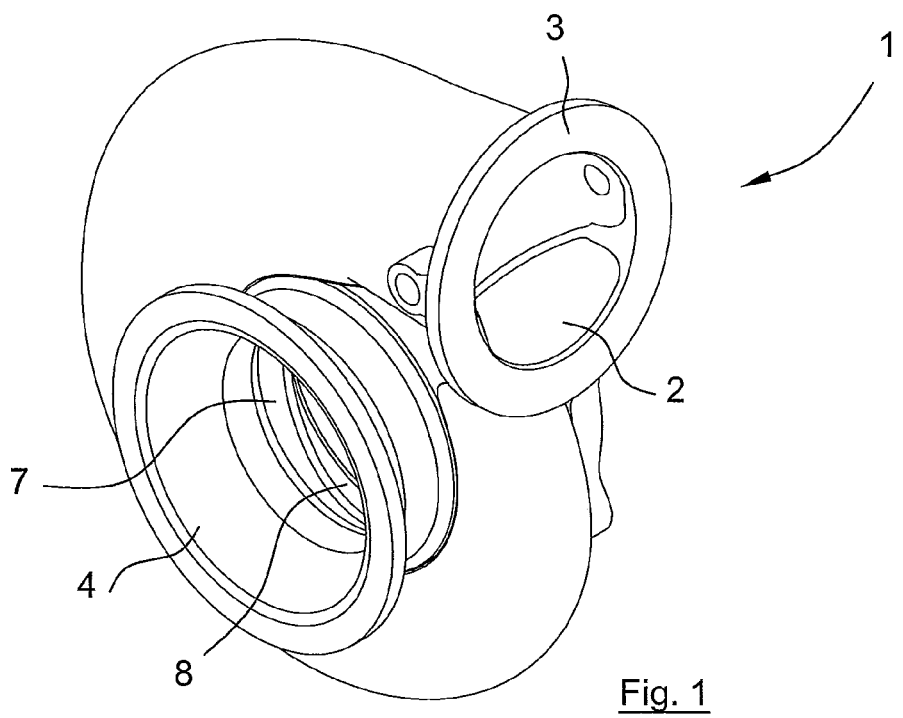
FIG. 1 is a perspective view of an inventive turbine housing, showing the outlet of the turbine housing.
Figure 2:
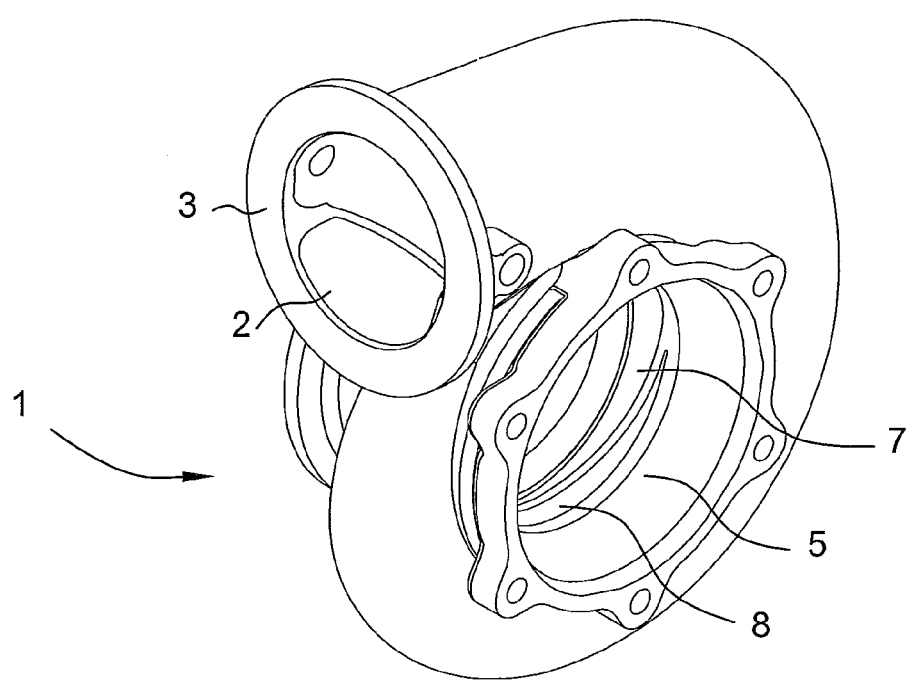
FIG. 2 is a perspective view of the turbine housing according to FIG. 1, showing the turbine seat of the turbine housing.

Reference is now made to FIGS. 1 and 2. In particular the present invention relates to a turbine housing, generally designated 1. The turbine housing 1 comprises an inlet opening 2, which is surrounded by a flange 3 which is arranged to be connected to a manifold or the like (not shown) leading the exhaust gas that flows out from the working cylinders of the combustion engine to the inlet opening 2 of the turbine housing 1. Furthermore, the turbine housing 1 comprises in a conventional way an outlet opening 4 for discharging the exhaust gas from the turbine housing 1 to a conventional exhaust system (not shown), which may comprise a catalyst, a silencer, etc. Furthermore, the turbine housing 1 comprises a turbine seat 5 being arranged to house a rotatably arranged turbine (not shown), which is connected to and drive a compressor impeller that is rotatably arranged in a compressor housing, for overcharging the intake air of the working cylinders of the combustion engine. The inlet opening 2 is in the shown embodiment tangentially arranged and the outlet opening 4 is axially arranged, seen in relation to the rotational axis of the turbine.

Figure 3:
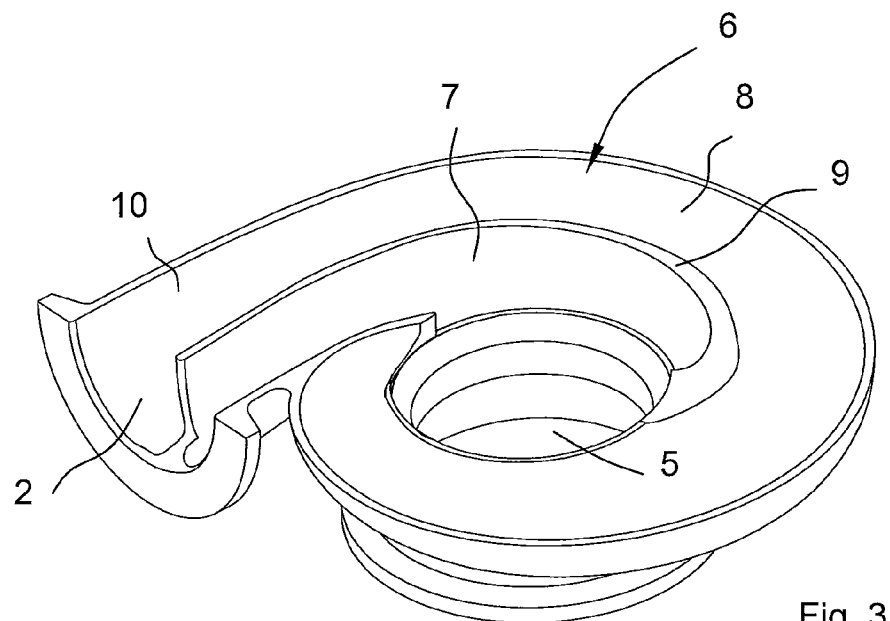
FIG. 3 is a perspective view of the left half of the turbine housing according to FIGS. 1 and 2, showing the interior of the turbine housing.
Figure 4:
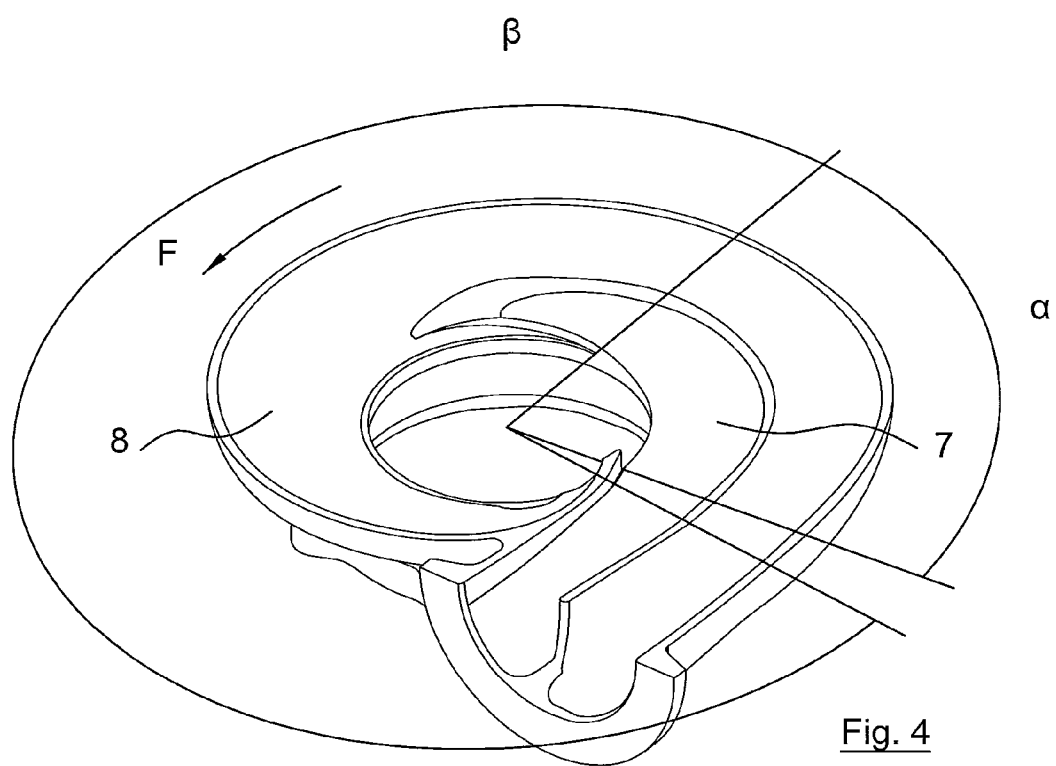
FIG. 4 is a perspective view of the right half of the turbine housing according to FIGS. 1 and 2, corresponding to FIG. 3, showing the interior of the turbine housing.

Reference is now made to FIGS. 3 and 4. The inventive turbine housing 1 comprises a race, generally designated 6, extending from said inlet opening 2 to said turbine seat 5. Thus, the race 6 is arranged to lead the exhaust gas from the inlet opening 2 to the turbine seat 5 and the turbine. Furthermore, said race 6 comprises a first spiral chamber 7 that mouth into said turbine seat 5 and a second spiral chamber 8 that mouth into said turbine seat 5. The first spiral chamber 7 and the second spiral chamber 8 are in the shown embodiment separated from each other along the entire length thereof by means of a wall 9. The wall 9 extends from an inlet 10 of the turbine housing 1. The inlet 10 is a part of the race 6 and extends from the inlet opening 2 to the point where the first spiral chamber 7 mouth into the turbine seat 5. In one embodiment the wall 9 extends all the way from the inlet opening 2, and in other embodiments the wall 9 extends from between the inlet opening 2 and the point where the first spiral chamber 7 mouth into the turbine seat 5. Preferably the first spiral chamber 7 mouth into the turbine seat 5, seen in an axial direction, between the outlet opening 4 of the turbine housing 1 and the mouth of the second chamber 8 into the turbine seat 5. However, the reverse relationship that the second spiral chamber 8 mouth into the turbine seat 5, seen in the axial direction, between the outlet opening 4 of the turbine housing 1 and the mouth of the first spiral chamber 7 into the turbine seat 5 is possible.

It is essential for the invention that both the first spiral chamber 7 and the second spiral chamber 8 mouth in a first angular segment $\beta$ of the turbine seat 5, the axial height of the mouth into the turbine seat 5 of the second spiral chamber 8 in said first angular segment $\beta$ being bigger at the end of the first angular segment $\beta$ than in the beginning thereof seen in a flow direction F.

Figure 8:
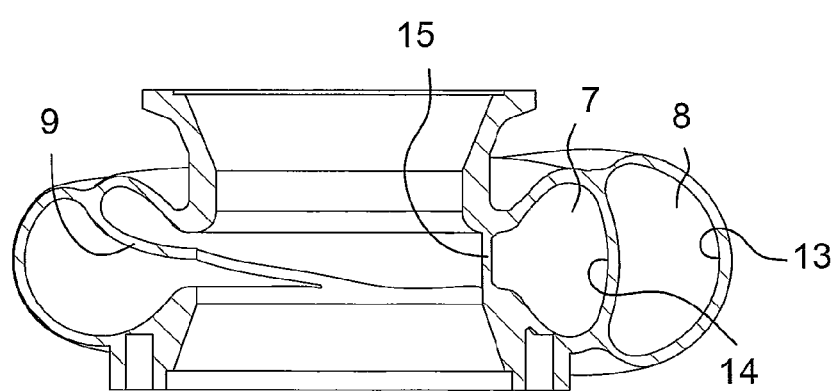
FIG. 8 is a cross sectional view of the turbine housing taken along line VIII in FIG. 7.
Figure 9:
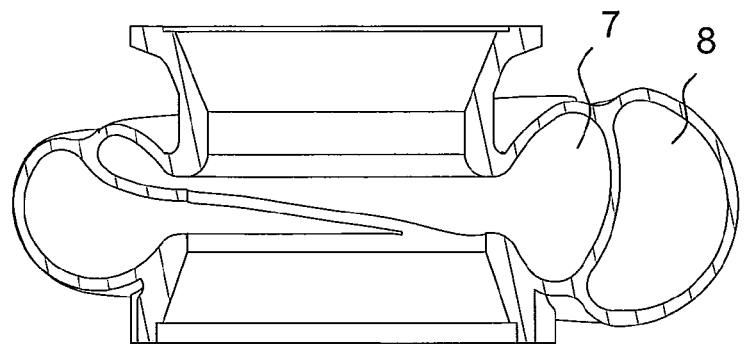
FIG. 9 is a cross sectional view of the turbine housing taken along line IX in FIG. 7.
Figure 10:
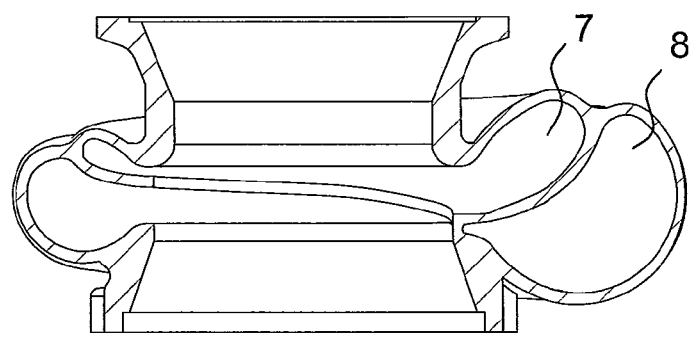
FIG. 10 is a cross sectional view of the turbine housing taken along line X in FIG. 7.
Figure 11:
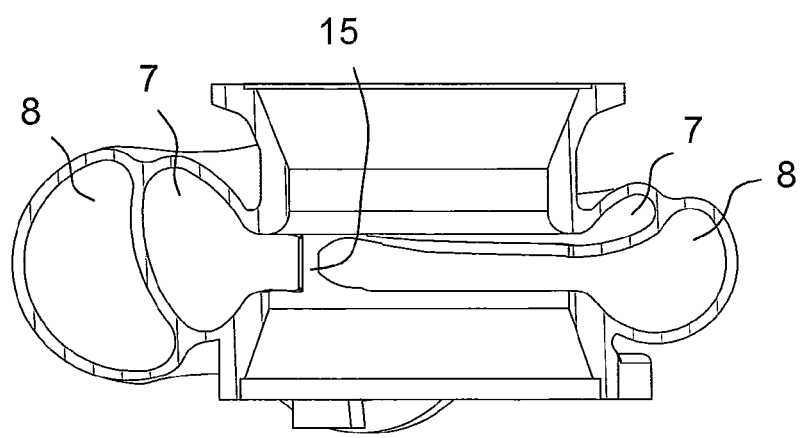
FIG. 11 is a cross sectional view of the turbine housing taken along line XI in FIG. 7.

Furthermore, it is preferred that only the first spiral chamber 7 mouth into a second angular segment $\alpha$ of the turbine seat 5, which second angular segment $\alpha$ is arranged downstream and adjacent the inlet 10 of the turbine housing 1, seen in the flow direction F. In other words, the second angular segment $\alpha$ starts in the point where the first spiral chamber 7 mouth into the turbine seat 5. In a preferred embodiment the wall 9 has a principally axial extension parallel to the flow direction F in said second angular segment $\alpha$, and preferably in the inlet 10 as well. More preferably the part of the wall 9 that border on the first spiral chamber 7 presents a curved cross section, having its centre of curvature radially inside the wall 9, in said second angular segment $\alpha$ and/or in the inlet 10, which entail a soft transition between the wall 9 and the other surfaces delimiting the first spiral chamber 7, which in its turn contribute to decrease the friction in the first spiral chamber 7. Furthermore, it is also preferred that the part of the wall 9 that border on the second spiral chamber 8 presents a curved cross section, having its centre of curvature radially inside the wall 9, in said second angular segment $\alpha$ and/or in the inlet 10, and furthermore has a soft transition to the other surfaces delimiting the second spiral chamber 8. This entail that the second spiral chamber 8 obtain a so called cobra-bend (see FIGS. 8 and 9), which provide minimal turbulence in the exhaust gas flow. However, it shall be pointed out that any conceivable cross section may be used in the first spiral chamber 7 as well as in the second spiral chamber 8.

The manifold, or the like, that is arranged to be connected to the flange 3 of the inlet opening 2 of the turbine housing 1 as described above, comprises either common or divided supply of exhaust gas to the turbine housing 1. In the case of common supply all the exhaust gases that shall be lead to the turbine housing are lead from the combustion engine to the turbine housing 1 as one single exhaust gas flow, where a part of the exhaust gases flow into the first spiral chamber 7 and the remaining part of the exhaust gases flow into the second spiral chamber 8. Furthermore, the turbine housing 1 may in the case of common supply comprise different throttles or flow regulators in order to control the flow to any, both of none of the first spiral chamber 7 and the second spiral chamber 8, which will be described below. In the case of divided supply the exhaust gas from any or some of the working cylinders of the combustion engine is lead to the first spiral chamber 7 and from any or some of the working cylinders of the combustion engine to the second spiral chamber 8.

Figure 5:
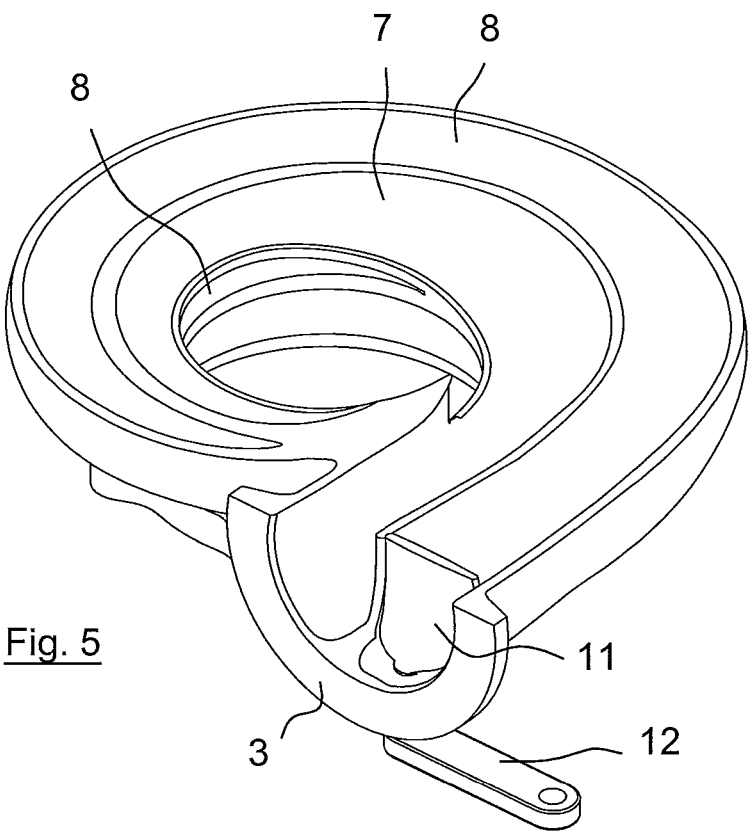
FIG. 5 is a perspective view of a cross section of an alternative embodiment of the turbine housing comprising a flow regulator in closed condition, which cross section is taken closer to the outlet of the turbine housing than the cross section according to FIG. 4.
Figure 6:
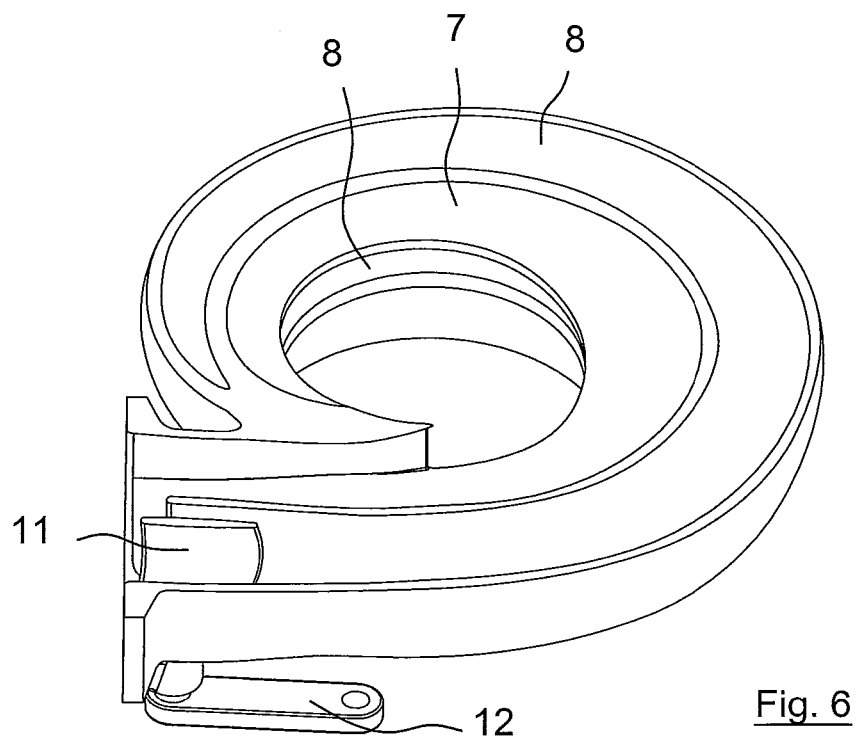
FIG. 6 is a perspective view showing the flow regulator in the open condition, corresponding to FIG. 5.
Figure 7:
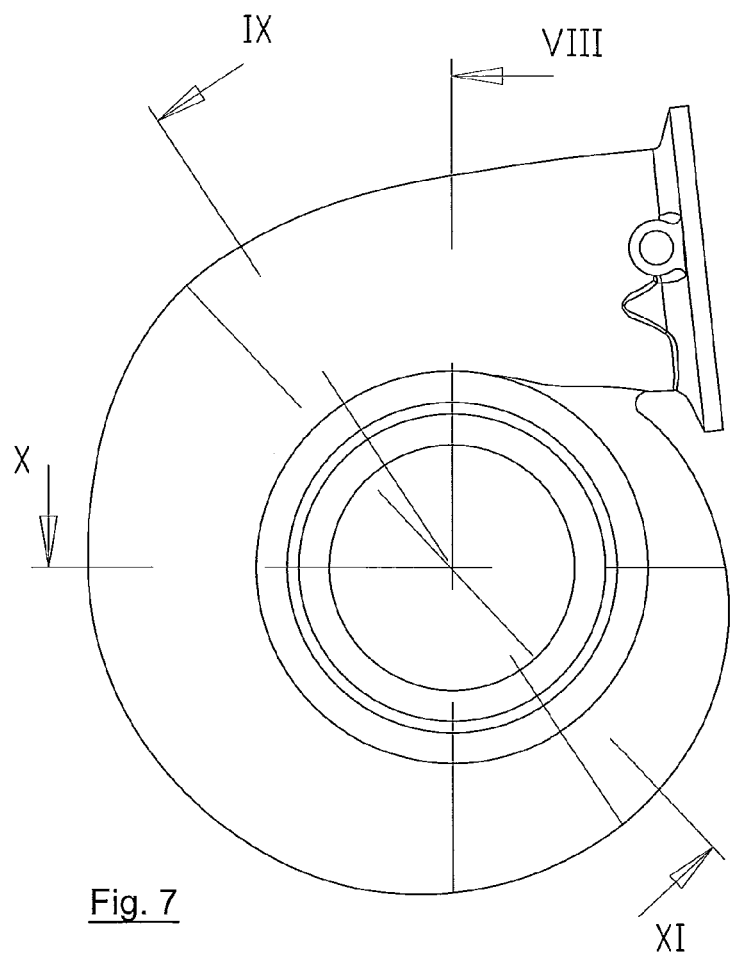
FIG. 7 is an elevated view of the inventive turbine housing showing the outlet of the turbine housing, as well as showing cross section placements.

Reference is now made to FIGS. 5 and 6, in which an alternative embodiment of the turbine housing 1 according to FIGS. 3 and 4 is shown. The turbine housing 1 according to the alternative, preferred embodiment comprises, in addition to that described in connection with FIGS. 1-4, a maneuverable flow regulator 11 arranged in the second spiral chamber 8. In FIG. 5 the flow regulator 11 is shown in a the second spiral chamber 8 closed condition, and in FIG. 6 the flow regulator 11 is shown in a the second spiral chamber 8 open condition. It shall be pointed out that the flow regulator 11 preferably can occupy all positions between the closed position and the open position. The flow regulator 11 is in the shown embodiment turnably movable between the closed position and the open position, and maneuverable by means of a lever 12, however any equivalent maneuvering is conceivable. Opening and closing of the flow regulator 11 may for instance be connected to the rotational speed of the combustion engine, a position and/or a movement of a throttle lever, existing exhaust gas pressure in the turbine housing 1 or in any other suitable part of the exhaust system leading from the combustion engine, etc. According to an alternative embodiment the flow regulator is designed as a pressure controlled non return valve (not shown), that automatically opens when a specific pressure is obtained at for instance the inlet opening 2 of the turbine housing 1. It shall be pointed out that when the flow regulator 11 is in the closed position, it do not necessarily need to seal the second spiral chamber 8 entirely but a gap between the inner surface of the second spiral chamber 8 and the flow regulator 11 is allowed. Preferably the flow regulator 11 shall cover at least 80% of the cross sectional area of the second spiral chamber 8 at the flow regulator 11, preferably at least 90%. Thus, no expensive or complicated seat for the flow regulator 11 is needed. The flow regulator 11 in the second spiral chamber 8 may be used as a maneuverable waste gate for the first spiral chamber 7 in order to even out the pressure during the pressure raising phase in the first spiral chamber 7, instead of using a conventional waste gate which allows the exhaust gas to bypass the supercharger when the backpressure in the first spiral chamber 7 of the turbine housing 1 is to high. A conventional waste gate may be used in a conventional way in order to even out the pressure when both the first spiral chamber 7 and the second spiral chamber 8 are fully opened.

According to yet another alternative embodiment a maneuverable flow regulator (not shown) is arranged in the first spiral chamber 7. The presence of the flow regulator in the first spiral chamber 7 is not dependent on the presence of the flow regulator 11 in the second spiral chamber 8.

The flow regulator in the first spiral chamber 7 is movably arranged between a the first spiral chamber 7 closed condition, and a the first spiral chamber 7 open condition. It shall be pointed out that the flow regulator preferably can occupy all positions between the closed position and the open position. The flow regulator is preferably turnably movable between the closed position and the open position, and maneuverable by means of a lever (not shown), however any equivalent maneuvering is conceivable. Opening and closing of the flow regulator may for instance be connected to the rotational speed of the combustion engine, a position and/or a movement of a throttle lever, existing exhaust gas pressure in the turbine housing 1 or in any other suitable part of the exhaust system leading from the combustion engine, etc. According to an alternative embodiment the flow regulator is designed as a pressure controlled non return valve (not shown), that automatically opens when a specific pressure is obtained at for instance the inlet opening 2 of the turbine housing 1. It shall be pointed out that when the flow regulator is in the closed position, it do not necessarily need to seal the first spiral chamber 7 entirely but a gap between the inner surface of the first spiral chamber 7 and the flow regulator is allowed. Preferably the flow regulator shall cover at least 80% of the cross sectional area of the first spiral chamber 7 at the flow regulator, preferably at least 90%. Thus, no expensive or complicated seat for the flow regulator is needed.

In the case the turbine housing 1 comprises a flow regulator in the first spiral chamber 7 and a flow regulator 11 in the second spiral chamber 8, both can be closed for instance during cold starting in order to instead lead the warm exhaust gas via a maneuverable valve to bypass the supercharger and to a catalyst in order to obtain quick heating of the catalyst as the exhaust gases are not chilled in the supercharger 1. Furthermore, both can be half opened, or partly opened, at engine speeds that are between low and high engine speed, in order to even out pressure pikes that usually are bypassed the supercharger via a waste gate (not shown).

It shall be pointed out that the manifold, or the like, that is arranged to be connected to the flange 3, of the inlet opening 2 of the turbine housing 1 shown in FIGS. 5 and 6, comprises common supply of the exhaust gases to the turbine housing 1. Thus, all the exhaust gases that shall be lead from the combustion engine to the turbine housing 1 are lead as a single exhaust gas flow, where the basic setting is that the exhaust gas flow at small exhaust gas flow only is allowed to flow into the first spiral chamber 7, and where the exhaust gas flow at large exhaust gas flow is allowed to flow into both the first spiral chamber 7 and the second spiral chamber 8.

It shall be pointed out that even if the inventive turbine housing 1 does not comprise any flow regulators in the first spiral chamber 7 or in the second spiral chamber 8 and comprises common supply of the exhaust gases, the turbine housing 1 is arranged to provide desired overcharge at small exhaust gas flow as well as at large exhaust gas flow. Thus, the exhaust gas flow entering the first spiral chamber 7 at small exhaust gas flow will be prevailing the exhaust gas flow entering the second spiral chamber 8, since the exhaust gas flow entering the first spiral chamber 7 will obtain a higher speed than the exhaust gas flow entering the second spiral chamber 8 due to the geometry thereof, and a desired overcharge is obtained at small exhaust gas flow. Furthermore, the exhaust gas flow entering the second spiral chamber 8 at large exhaust gas flow will be prevailing the exhaust gas flow entering the first spiral chamber 7, since a back pressure will after a little while arise in the first spiral chamber 7 which will force the most of the exhaust gas flow to enter the second spiral chamber 8 which geometry is optimized for large exhaust gas flow, and a desired overcharge is obtained at large exhaust gas flow.

Reference is now also made to FIGS. 7-11. It is preferred that an outer determining surface 13 of the second spiral chamber 8 is arranged outside an outer determining surface 14 of the first spiral chamber 7 seen in the radial direction. Furthermore, it is preferred that in each radial cross section of the race 6 the second spiral chamber 8 presents a bigger cross sectional area than the first spiral chamber 7. Due to this a specific exhaust gas flow obtain a higher speed and more acute attack angle in the first spiral chamber 7 than in the second spiral chamber 8, which in its turn provide a quick activation of the supercharger even at small exhaust gas flow. In the shown embodiment, when only the first spiral chamber 7 is open, the turbine housing 1 has a A/R-ratio equal to 0.4, and when both the first spiral chamber 7 and the second spiral chamber 8 are fully opened the turbine housing has a A/R-ratio equal to 1. However, it is conceivable that the turbine housing 1 has lower as well as higher A/R-ratio. The A/R-ratio may range from a value equal to 0 if both the first spiral chamber 7 and the second spiral chamber 8 are closed and upwards. A conceivable upper value of the A/R-ratio is for instance equal to 2.

Preferably the A/R-ratio of the second spiral chamber 8 is bigger than the A/R-ratio of the first spiral chamber 7.

It is described above that it is preferred that both the first spiral chamber 7 and the second spiral chamber 8 mouth in the first angular segment β of the turbine seat 5, which first angular segment β is arranged downstream and adjacent said second angular segment α. Furthermore, it is preferred that only the first spiral chamber 7 mouth in the second angular segment α of the turbine seat 5. In the preferred embodiment the wall 9 transits in the first angular segment β to a more and more radial extension parallel to the flow direction F. It shall be pointed out that the second spiral chamber 8 may also mouth in the second angular segment α, but the axial height of the mouth of the second spiral chamber 8 as well as of the mouth of the first spiral chamber 7 are unchanged in the second angular segment α seen in the flow direction F. Even in the first angular segment β the mouth of the first spiral chamber 7 as well as the mouth of the second spiral chamber 8 may independently from each other be unchanged in sub segments.

The second angular segment α may be bigger than or equal to zero. Preferably the second angular segment α of the turbine seat 5 is bigger than 40 degrees, more preferably bigger than 80 degrees. Furthermore, the second angular segment α is smaller than 120 degrees. In the shown, most preferred embodiment the second angular segment α is equal to 90 degrees. Furthermore, said first angular segment β and said second angular segment α preferably bigger than 300 degrees, more preferably bigger than 340 degrees. In the shown most preferred embodiment the sum of the first angular segment β and the second angular segment α is equal to 350 degrees. It shall be pointed out that the difference between an entire revolution of 360 degrees and the sum of the first angular segment β and the second angular segment α is constituted by a wall 15 of the turbine housing 1, or is constituted by a combination of the wall 15 of the turbine housing and a third angular segment arranged downstream and adjacent the first angular segment β, in which third angular segment only the second spiral chamber 8 mouth into the turbine seat 5.

Preferably the axial height of the mouth into the turbine seat 5 of the second spiral chamber 8 increases gradually in the first angular segment β in the direction of said flow direction F, and the axial height of the mouth into the turbine seat 5 of the first spiral chamber 7 decreases gradually in the first angular segment β in the direction of said flow direction F. Preferably this gradual change takes place non-linearly. It is preferred that the axial height of the mouth into the turbine seat 5 of the first spiral chamber 7 is smaller in the end of the first angular segment β than in the beginning of the first angular segment β seen in said flow direction F.

In the shown embodiment the axial height of the mouth into the turbine seat 5 of the first spiral chamber 7 is approximately equal to the axial height of the mouth into the turbine seat 5 of the second spiral chamber 8 at about 90 degrees from the beginning of the first angular segment β. Furthermore, the axial height of the mouth into the turbine seat 5 of the first spiral chamber 7 is approximately one forth of the axial height of the mouth into the turbine seat 5 of the second spiral chamber 8 at about 180 degrees from the beginning of the first angular segment β.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

It shall be pointed out that the first spiral chamber and the second spiral chamber do not necessarily need to be adjacent each other in the entire race extending from the inlet opening to the turbine seat.

It shall also be pointed out that all information about/concerning terms such as above, below, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

The invention claimed is:

1. A turbine housing for a supercharger, comprising:
an inlet opening (2), a turbine seat (5) and a race (6) extending from said inlet opening (2) to said turbine seat (5),
said race (6) comprising a first spiral chamber (7) which mouth into said turbine seat (5) and a second spiral chamber (8) which mouth into said turbine seat (5),
wherein the first spiral chamber (7) and the second spiral chamber (8) mouth into said turbine seat in parallel with each other in a first angular segment (β) of the turbine seat (5) and along an entire length of said first angular segment (β), the axial height of the mouth into the turbine seat (5) of the second spiral chamber (8) in said first angular segment (β) being bigger in the end of the first angular segment (β) than in the beginning thereof seen in a flow direction (F), and
wherein the A/R-ratio of the first spiral chamber (7) is smaller than the common A/R-ratio of the race when the first spiral chamber (7) and the second spiral chamber (8) are considered as having one common cross sectional area.

2. The turbine housing according to claim 1, wherein the second spiral chamber (8) comprises a maneuverable flow regulator (11).

3. The turbine housing according to claim 1, wherein the first spiral chamber (7) comprises a maneuverable flow regulator.

4. The turbine housing according to claim 1, wherein an outer determining surface (13) of the second spiral chamber (8) is arranged outside an outer determining surface (14) of the first spiral chamber (7) seen in the radial direction.

5. The turbine housing according to claim 1, wherein the second spiral chamber (8) presents a larger cross sectional area than the first spiral chamber (7) in each radial cross section of the race (6).

6. The turbine housing according to claim 1, wherein only the first spiral chamber (7) mouth in a second angular segment (α) of the turbine seat (5), which second angular segment (α) is arranged downstream and adjacent an inlet (10) of the turbine housing (1) seen in the flow direction (F).

7. The turbine housing according to claim 6, wherein both the first spiral chamber (7) and the second spiral chamber (8) mouth in the first angular segment (β) of the turbine seat (5), which first angular segment (β) is arranged downstream and adjacent said second angular segment (α) seen in the flow direction (F).

8. The turbine housing according to claim 1, wherein the axial height of the mouth into the turbine seat (5) of the second spiral chamber (8) in the first angular segment (β) is increasing in the direction of said flow direction (F).

9. The turbine housing according to claim 1, wherein axial height of the mouth into the turbine seat (5) of the first spiral chamber (7) in the first angular segment (β) is smaller in the end of the first angular segment (β) than in the beginning thereof seen in said flow direction (F).

10. The turbine housing according to claim 9, wherein axial height of the mouth into the turbine seat (5) of the first spiral chamber (7) in the first angular segment (β) is decreasing in the direction of said flow direction (F).

11. The turbine housing according to claim 6, wherein said second angular segment (α) of the turbine seat (5) is bigger than 40 degrees, preferably bigger than 80 degrees.

12. The turbine housing according to claim 6, wherein said first angular segment (β) and said second angular segment (α) of the turbine seat (5) together is bigger than 300 degrees, preferably bigger than 340 degrees.

13. The turbine housing according to claim 6, wherein the first spiral chamber (7) and the second spiral chamber (8) are separated from each other by means of a wall (9) having a principally axial extension in parallel with the flow direction in said second angular segment (α).

14. A supercharger for a combustion engine, characterized in that it comprises a turbine housing according to claim 1.

15. The turbine housing according to claim 2 wherein the first spiral chamber (7) comprises a maneuverable flow regulator.

16. The turbine housing according to claim 2, wherein an outer determining surface (13) of the second spiral chamber (8) is arranged outside an outer determining surface (14) of the first spiral chamber (7) seen in the radial direction.

17. The turbine housing according to claim 2, wherein the second spiral chamber (8) presents a larger cross sectional area than the first spiral chamber (7) in each radial cross section of the race (6).

18. The turbine housing according to claim 2 wherein only the first spiral chamber (7) mouth in a second angular segment (α) of the turbine seat (5), which second angular segment (α) is arranged downstream and adjacent an inlet (10) of the turbine housing (1) seen in the flow direction (F).

19. The turbine housing according to claim 2, wherein the axial height of the mouth into the turbine seat (5) of the second spiral chamber (8) in the first angular segment (β) is increasing in the direction of said flow direction (F).

20. The turbine housing according to claim 2, wherein axial height of the mouth into the turbine seat (5) of the first spiral chamber (7) in the first angular segment (β) is smaller in the end of the first angular segment (β) than in the beginning thereof seen in said flow direction (F).

\* \* \* \* \*